United States Patent Office 3,458,516
Patented July 29, 1969

3,458,516
11-[PIPERAZINYL]DIBENZ[b,f][1,4]OXAZEPINES AND ANALOGOUS THIAZEPINES
Charles Frederick Howell, Upper Saddle River, Robert Allis Hardy, Jr., Ridgewood, N.J., and Nicanor Quinones Quinones, New York, N.Y., assignors to American Cyanamid Company, Stamford, Conn., a corporation of Maine
No Drawing. Continuation-in-part of application Ser. No. 687,159, Dec. 1, 1967. This application Feb. 16, 1968, Ser. No. 705,900
Int. Cl. C07d 99/10, 99/04; A61k 27/00
U.S. Cl. 260—268                                    10 Claims

ABSTRACT OF THE DISCLOSURE

Compounds of the type substituted 11-aminodibenz-[b,f][1,4]oxazepines and substituted 11-aminodibenzo[b,f][1,4]-thiazepines are described. The preferred compounds are those having in the 11-position a piperazine, lower alkylpiperazine or hydroxy lower alkylpiperazine group and in the 1- to 4-positions of one benzene ring cyano, lower alkoxycarbonyl, di(lower alkyl)sulfamoyl, lower alkanoyl, nitro, amino or chloro lower alkenyl groups. Methods of preparing the preferred compounds are described. The compounds are physiologically active on the central nervous system and therefore useful as tranquilizers, hypnotics, etc.

---

This application is a continuation-in-part of our application Ser. No. 687,159, filed Dec. 1, 1967, now abandoned, which in turn, is a continuation-in-part of application Ser. No. 619,015, filed Feb. 27, 1967, now abandoned; and also a continuation-in-part of application Ser. No. 520,897, filed Jan. 17, 1966, now abandoned.

Brief summary of the invention

The present invention is in the field of compounds represented by the formula:

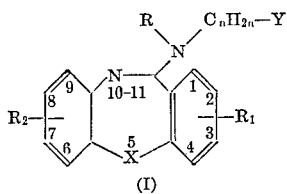

(I)

wherein X is oxygen or sulfur; R is hydrogen or lower alkyl, $R_1$ and $R_2$ are cyano, diloweralkylsulfamoyl, lower alkanoyl, α-chlorovinyl, lower alkoxycarbonyl, nitro or amino; Y is amino, hydroxy, lower alkylamino, di(lower alkyl)amino, lower alkoxy, 1-piperazinyl, 4-(lower alkyl)-1-piperazinyl, 4-(hydroxy lower alkyl)-1-piperazinyl, pyrrolidino, lower alkylpyrrolidino, piperidino, lower alkylpiperidino, morpholino, lower alkylmorpholino, and the

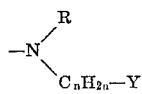

group taken together forms the residue of a piperazino radical selected from the group consisting of 1-piperazinyl, 4-(lower alkyl)-1-piperazinyl and 4-(hydroxy lower alkyl)-1-piperazinyl; n is an integer from 2 to 4 and non-toxic acid addition salts.

The more preferred compounds of this invention may be illustrated by the formula:

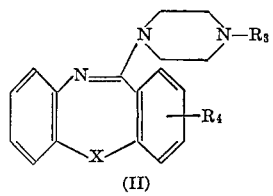

(II)

wherein X is oxygen or sulfur; $R_3$ is hydrogen, lower alkyl or hydroxy lower alkyl, $R_4$ is cyano, di(lower alkyl)sulfamoyl, lower alkanoyl, α-chlorovinyl, nitro, amino, or lower alkoxycarbonyl and non-toxic therapeutically useful acid addition salts.

The compounds of the present invention possess valuable central nervous system (CNS) properties at non-toxic doses. As such, they show one or more of the following CNS actions: tranquilizer, hypnotic and/or muscle relaxant type actions. The compounds have been tested pharmacologically and found to have the above properties which show a desirable wide spread between doses producing depressant or sedative actions and toxic symptoms such as paralysis or lethality. They are also analgesics.

The CNS depressant properties, such as tranquilizer, hynotic and muscle relaxant type activity, are indicated by several procedures. For example, a test which indicates hypnotic and/or muscle relaxant type activity is represented by the following rod walking test. Groups of 6 mice each are tested for their ability to walk across a horizontal rod in a normal manner after receiving graded intraperitoneal doses of a test compound. A median effective dose, rod walking dose (RWD) is estimated and shown in the table hereinafter.

A test which was used to determine tranquilizing activity is represented by a measure of the reduction in motor activity. One-half of the rod walking dose (RWD); see above, is given to a group of 5 mice and a 5 minute count of motor activity is recorded (actophotometer). Counts of ≦250 are considered to indicate a specific reduction (more than two standard deviations) of activity at a dose causing only minimal impairment of neurological function as measured by rod walking ability. Compounds that appear to reduce motor activity (≦250 count) are administered to additional groups of 5 mice at graded doses and tested similarly. The motor depressant dose (MDD) which causes a 50% reduction of motor activity (a count of 250) is estimated. The use of reduced motor activity as a measure of tranquilizing activity has been described by W. D. Gray, A. C. Osterberg and C. E. Rauh, Archives Internationales et de Therapie, vol. 134, p. 198 (1961) and by W. J. Kinnard and C. J. Carr, Journal of Pharmacology and Experimental Therapeutics, vol. 121, p. 354 (1957).

When tested by the above procedures, the following compounds of this invention show activity indicated in the table.

TABLE

| Compound | MDD, mg./kg. i.p. | RWD, mg./kg. i.p. |
|---|---|---|
| 2-dimethylsulfamoyl-11-(4-methyl-1-piperazinyl)dibenz[b,f][1,4]-oxazepine | 0.3 | 8.8 |
| 2-acetyl-11-(4-methyl-1-piperazinyl)dibenz[b,f][1,4]oxazepine | 0.1 | 1.4 |
| 2-(α-chlorovinyl)-11-(4-methyl-1-piperazinyl)-dibenz[b,f][1,4]oxazepine | 0.9 | 10 |
| 2-dimethylsulfamoyl-11-(4-methyl-1-piperazinyl)dibenzo[b,f][1,4]thiazepine | 8.3 | 100 |
| 2-ethoxycarbonyl-11-(4-methyl-1-piperazinyl)-dibenz[b,f][1,4]oxazepine | 13 | >100 |
| 2-nitro-11-(4-methyl-1-piperazinyl)dibenz[b,f][1,4]oxazepine | 0.2 | 2.5 |
| 2-amino-11-(4-methyl-1-piperazinyl)dibenz[b,f][1,4]oxazepine | 2.6 | 100 |

In addition, some of the new compounds of this invention show other valuable pharmaceutical properties such as analgesic activity.

The compounds of this invention are, in general, white crystalline solids only slightly soluble in water, but moderately soluble in organic solvents such as methanol, ethanol and the like. They are basic substances which are usually soluble in aqueous mineral acids at room temperature. They form substantially insoluble acid addition salts such as the hydrochloride, sulfate, phosphate, citrate, tartrate, maleate, fumarate, etc. The present compounds, generally in the form of their salts, may be administered orally or parenterally and when so administered are effective central nervous system agents. For oral administration, the new compounds of this invention may be incorporated with the usual pharmaceutical excipients and used, for instance, in the form of tablets, capsules, dragees, liquids to be administered in drops, emulsions, suspensions and syrups, and in chocolate, candy, chewing gum and the like. They may also be administered in suppositories, and in aqueous solutions for parenteral injection.

The new 11-aminodibenz[b,f][1,4]oxazepine and thiazepine derivatives of this invention may be prepared by a number of methods which are described hereinafter. By one general method, a dibenz-oxazepine or dibenzo-thiazepine of the formula:

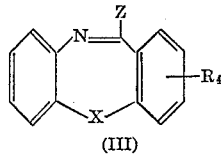

(III)

wherein $R_4$ and X are as defined above in the preferred embodiment, and Z is a reactive halogen, an arylsulfonyloxy group, an amino group or a lower alkylmercapto group is reacted with the reagent for introduction of the desired side chain. For example, an 11-halodibenz[b,f][1,4]oxazepine or thiazepine may be reacted with piperazine or a piperazine derivative.

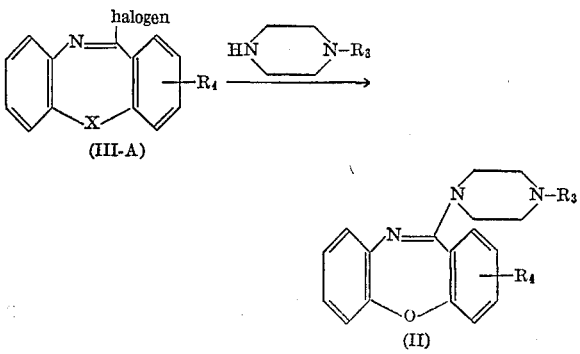

wherein X, $R_4$ and

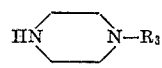

are as previously described.

The reactive intermediates (III–A) may be prepared by Beckmann rearrangements of substituted xanthone or thiaxanthone oximes in the presence of phosphorus halides. Alternately, a substituted dibenz[b,f][1,4]oxazepine-11(10H)-one or dibenzo[b,f][1,4]thiazepine-11(10H)-one may be converted to (III–A) with phosphorus halides or thionyl halides. The reactive halogen intermediates (III–A) may be isolated or, more conveniently, are prepared in situ and reacted with a piperazine without isolation. Suitable piperazines include N-methylpiperazine, piperazine, 1-(2-hydroxyethyl)piperazine and the like. This reaction is generally carried out in an inert solvent such as, for example, benzene, toluene, ether, tetrahydrofuran, chloroform, and the like. The reaction frequently proceeds spontaneously at room temperature, but the temperature may range from about 0° C. to about 150° C. It is usually complete within several hours.

A further general method for the synthesis of the novel 11-aminodibenz[b,f][1,4]oxazepines and thiazepines of this invention is illustrated as follows:

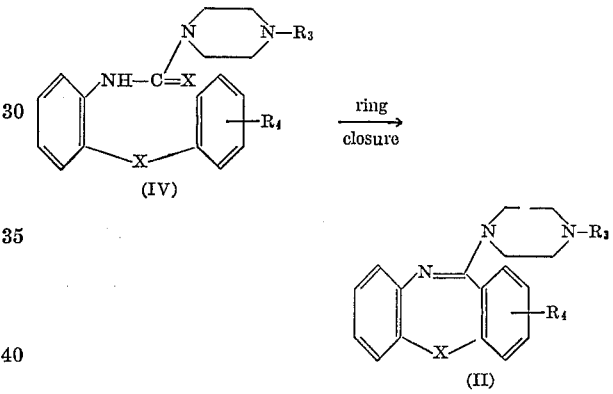

wherein X, $R_3$ and $R_4$ are as previously described. By this method, o-ureidodiphenyl ether derivatives are treated with condensing agents such as phosphorus oxychloride, phosphorus pentachloride, phosphorus pentoxide, polyphosphoric acid, zinc chloride, aluminum chloride and the like in the presence or absence of an inert solvent such as xylene, toluene, and the like. Conveniently, the hydrochlorides of the o-ureidodiphenyl ether intermediates are treated with an excess of the condensing agent, such as phosphorus oxychloride, which also acts as the solvent. The temperature range is from about 100° C. to about 150° C. and the reaction is substantially complete in from several hours to about 72 hours.

Additionally, the preferred procedures for certain compounds within the scope of this invention comprises transformations of the appropriate $R_3$ and/or $R_4$ groups. For example, when $R_3$=H, these compounds may be treated with an alkylating agent such as a dialkyl sulfate, an alkyl halide, an alkylene oxide, or a reductive alkylation mixture. Also, when $R_4$=nitro or amino, these groups may be transformed to cyano, lower alkanol or diloweralkylsulfamoyl groups by reduction, diazotization and replacement procedures.

Detailed description

The following examples describe in greater particularity the preparation of representative compounds of the present invention.

EXAMPLE 1

Preparation of p-(o-aminophenoxy)acetophenone

A mixture of 27.8 g. (0.20 mole) of p-hydroxyacetophenone, 31.5 g. (0.20 mole) of o-chloronitrobenzene, 27.6 g. (0.20 mole) of potassium carbonate and 0.2 g.

of zinc-precipitated copper in 200 ml. of benzene is heated for about 4 hours under reflux. The reaction mixture is poured into 1 l. of water and stirred until a solid product separates. The solid is collected, washed with water (500 ml.) and then with petroleum ether (100 ml.) and dried in the air; p-(o-nitrophenoxy)acetophenone, melting point, 89–92° C., is thereby obtained. When recrystallized from 1:2 benzene-petroleum ether, this compound melts at 95–96° C.

Hydrogenation of a mixture of 12.5 g. of the above p-(o-nitrophenoxy)acetophenone and 100 ml. of ethanol in the presence of 0.1 g. of 10% palladium-on-charcoal is carried out until the theoretical amount of hydrogen is absorbed. The catalyst is removed by filtration, and the alcohol is evaporated under reduced pressure. The solid residue is recrystallized from ether-petroleum ether and p-(o-aminophenoxy)acetophenone, melting point 70–71° C., is thereby obtained.

EXAMPLE 2

Preparation of o-(p-dimethylsulfamoylphenoxy)aniline

A mixture of 56 g. (0.25 mole) of the dihydrate of sodium p-phenolsulfonate and 110 ml. of acetic anhydride is heated under reflux for 4 hours and concentrated to a solid. The solid is treated with 200 ml. of toluene and 60 g. of phosphorous pentachloride and refluxed for 1 hour. Concentration yields a mixture of solids containing p-acetoxybenzenesulfonylchloride.

This crude mixture is reacted with 200 ml. of chloroform and filtered to remove salts. The filtrate is saturated at 0–10° C. with anhydrous dimethylamine for 4 hours (when loss of the enol acetate band at 5.65μ was complete) and then filtered from dimethylamine hydrochloride. Concentration of the filtrate gives N,N-dimethyl-p-hydroxybenzenesulfonamide (somewhat contaminated with N,N-dimethylacetamide) as an oil. This oil is stirred with 40 g. of potassium carbonate in 200 ml. of dimethylformamide at 10° C. for 2 hours and then heated under reflux for 4 hours with 40 g. of o-chloronitrobenzene and 1 g. of zinc-precipitated copper. After standing overnight, the solvent is removed and the residue is triturated with 500 ml. of water to give solid N,N-dimethyl-p-(o-nitrophenoxy)benzenesulfonamide. Recrystalliztaion from benzene-petroleum ether then gives material of melting point 111–112° C.

A mixture of 20 g. of the above nitroether, 60 g. of stannous chloride dihydride and 600 ml. of ether is stirred and treated cautiously with 20 ml. of concentrated hydrochloric acid at such a rate as to maintain gentle reflux. After stirring overnight, the aqueous layer is removed, treated with sodium bicarbonate to precipitate solids, and filtered. The solids are extracted thoroughly with 600 ml. of hot benzene. The benzene solution containing the desired amine is dried over potassium carbonate, filtered and concentrated to yield solid o-(p-dimethylsulfamoylphenoxy)aniline. When recrystallized from benzene-petroleum ether, this product melts at 152–155° C.; it may also be purified by sublimation.

EXAMPLE 3

Preparation of 2-dimethylsulfamoyl-11-(4-methyl-1-piperazinyl)-dibenz[b,f][1,4]oxazepine Crude o-(p-dimethylsulfamoylphenoxy)aniline (about 17 g.) in a mixture of 40 ml. of benzene and 100 ml. of petroleum ether is diluted with 50 ml. of pyridine and treated slowly with a solution of 30 g. of ethyl chlorocarbonate in 100 ml. of ether. The mixture is heated under reflux for 3 hours and concentrated. The residue on dilution with 400 ml. of water and filtering the solid, yields about 16 g. of ethyl o-(p-dimethylsulfamoylphenoxy)carbanilate, melting point 132–134° C. This compound melts at 134–135° C. when recrystallized from benzene-petroleum ether.

A mixture of 6 g. of the above carbanilate, 10 ml. of N-methylpiperazine and 40 ml. of benzene is heated under reflux for 5 days and then concentrated to dryness. The oily residue is suspended in 200 ml. of water and acidified with conc. hydrochloric acid. The resulting insoluble hydrochloride is collected, and recrystallized from methanol-ether. 2'-(p-dimethylsulfamoylphenoxy)-4-methyl-1-piperazinecarboxanilide hydrochloride, melting point 241–243° C., is thereby obtained and this product is satisfactory for use in the next step without further purification.

A mixture of 1.5 g. of the above salt, 4.0 g. of phosphorus pentoxide, and 20 ml. of phosphorus oxychloride is refluxed for 32 hours, cooled and poured onto ice. The product is extracted with chloroform after making the aqueous solution basic with concentrated ammonium hydroxide and dried over potassium carbonate. Concentration yields 1.4 g. of crude base which may be purified by adsorption chromatography on silica gel or, better, by partition chromatography on diatomaceous earth using a heptane-methanol solvent system. Concentration of the appropriate fraction of eluate (fifth hold-back volume) yields 2 - dimethylsulfamoyl-11-(4-methyl-1-piperazinyl) dibenz[b,f][1,4]-oxazepine, as a low-melting solid. This base is conveniently converted, with maleic acid in ethanol-ether, to the maleate salt, melting point 142–145° C. when recrystallized from acetone-ether.

EXAMPLE 4

Preparation of 2-acetyl-11-(4-methyl-1-piperazinyl) dibenz[b,f][1,4]oxazepine

A solution of 15 ml. of ethyl chlorocarbonate in 150 ml. of ether is added to a solution of 10 g. of p-(o-aminophenoxy)acetophenone in 100 ml. of chloroform at 0–10° C. followed by 15 ml. of pyridine. The mixture is refluxed for 2 hours and then concentrated. The residue is stirred with water for 30 minutes and then extracted with 150 ml. of ether. Drying over potassium carbonate, filtration and concentration then yields ethyl o-(p-acetylphenoxy)carbanilate as an oil suitable for use in the next step; this product may be obtained as a solid, melting point 56–58° C., when crystallized from petroleum ether.

A mixture of 26 g. of the above carbanilate and 30 ml. of N-methylpiperazine containing a trace of sodium methoxide is heated at 100° C. for three days, and then refluxed for 4 hours and concentrated. The product is warmed with 400 ml. of 10% hydrochloric acid, filtered and the filtrate is made basic with potassium carbonate. The resulting 2'-(p-acetylphenoxy)-4-methyl - 1 - piperazinecarboxanilide melts at about 131–134° when recrystallized from benzene.

A mixture of 10 g. of the hydrochloride of the above 1-piperazinecarboxanilide (prepared from the base with hydrogen chloride in chloroform), 40 ml. of phosphorus oxychloride and 10 g. of phosphorus pentoxide is heated under reflux for 20 hr. and concentrated. The residue suspended in 400 ml. of ether is stirred with 200 g. of ice for 1 hour. The ether layer is isolated, dried over potassium hydroxide pellets, filtered and concentrated to give about 6 g. of a mixture of bases. These bases are separated by partition chromatography on an activated diatomaceous earth column by eluting with the upper phase of a mixture of methyl Cellosolve and heptane while monitoring the ultraviolet absorption of the eluate at 240 mμ. Concentration of the fraction eluted at the 6th to 7th hold-back-volume gives 2-acetyl-11-(4-methyl-1-piperazinyl)dibenz[b,f][1,4]oxazepine which melts at about 116–118° C.

EXAMPLE 5

Preparation of 2-(α-chlorovinyl)-11-(4-methyl-1-piperazinyl) dibenz[b,f][1,4]oxazepine Concentration of another ultraviolet-absorbing fraction from the chromatogram described in Example 4, which is eluted at about the 5th to 6th hold-back-volume, yields 2-(α-chlorovinyl)-11-(4 - methyl-1-piperazinyl)dibenz[b,f][1,4]oxazepine which melts at about 64–68° C.

EXAMPLE 6

Preparation of o-(p-dimethylsulfamoylphenylthio)aniline

To a solution of 125 g. of chlorosulfonic acid in 150 ml. of chloroform is added 87.5 g. (0.4 mole) of diphenyldisulfide drop by drop at 25–35° C. The mixture is stirred overnight, diluted with 500 ml. of chloroform and stirred with 400 g. of ice. After drying over sodium sulfate and chloroform solution is saturated with dimethylamine and stored overnight. Cooling to 0° C. and filtering gives 10 g. of 4-(N,N-dimethylsulfamoyl)diphenyldisulfide, melting point 132–136° C.

A mixture of the above disulfide (10 g.) and 10 g. each of zinc dust and ammonium chloride in 100 ml. of ethanol with a fed drops of water is stirred on a steam bath for 6 hrs., diluted with 100 ml. of water and filtered. Concentration of the filtrate, addition of 100 ml. of water, and cooling to 0° gives colorless 4-mercapto-N,N-dimethylbenzenesulfonamide, M.P. 100–102° C. soluble in sodium hydroxide.

Reaction of this sulfonamide with o-nitrochlorobenzene in dimethylformamide containing potassium carbonate and a little copper powder, by the general method of Example 2, yields N,N-dimethyl-p-(o-nitrophenylthio)benzenesulfonamide. Reduction of this nitro compound with stannous chloride in a mixture of ether and hydrochloric acid then yields o-(p-dimethylsulfamoylphenylthio)aniline, melting point 120–122° C.

EXAMPLE 7

Preparation of p-(o-aminophenylthio)acetophenone

A mixture of 20 g. of p-bromoacetophenone and 12.5 g. of o-aminobenzenethiol is heated in 40 ml. of dimethylformamide in the presence of 14 g. of potassium carbonate. After 6 hours of refluxing, the reaction mixture is concentrated to dryness and triturated thoroughly with 1 N sodium hydroxide. The insoluble fraction is dissolved in hydrochloric acid, washed with ether and precipitated with ammonium hydroxide to yield p-(o-aminophenylthio)acetophenone, melting point 78–80° C.

EXAMPLE 8

Preparation of 2-dimethylsulfamoyl-11-(1-piperazinyl)dibenzo[b,f][1,4]thiazepine o-(p-Dimethylsulfamoylphenylthio)amine (23.5 g.) is treated with 20 ml. of ethyl chlorocarbonate in benzene-pyridine and heated under reflux for 2 hours. Bases are removed by extraction with hydrochloric acid, and the resulting benzene solution of ethyl o-(p-dimethylsulfamoylphenylthio)- carbanilate is heated with carbethoxy piperazine containing a catalytic amount of sodium methoxide. 4-carbethoxy-2'-(p-dimethylsulfamolyphenylthio)-1-piperazinecarboxanilide is thereby obtained. This 1-piperazinecarboxanilide (12 g.) is cyclized by boilind (for about 1 day) with a mixture of 20 ml. of phosphorus oxychloride and 12 g. of phosphorus pentoxide to give, after purification by partition chromatography, 2-dimethylsulfamoyl - 11-(1 - piperazinyl)dibenzo[b,f][1,4]thiazipine, melting point 176–178°.

EXAMPLE 9

Preparation of 2-dimethylsulfamoyl-11-(1-piperazinyl)dibenz[b,f][1,4]oxazepine

About 45 g. of o-(p-dimethylsulfamoylphenoxy)aniline in 200 ml. of ether containing 50 ml. of pyridine is treated with 50 ml. of ethyl chlorocarbonate and refluxed for 2.5 hours. The reaction mixture is concentrated to dryness and the residue is washed with 300 ml. of water and with 200 ml. of dilute hydrochloric acid. The resulting ethyl o-(p-dimethylsulfamoylphenoxy)carbanilate has the meltpoint 132–134° when purified.

A mixture of 12 g. of the carbanilate, 20 g. of piperazine and 20 ml. of pyridine in 20 ml. of toluene is heated at 95–100° C. for 2 days and concentrated. The residue is extracted with 200 ml. of dilute hydrochloric acid and filtered. The filtrate is basified wih potassium carbonate and extracted with chloroform. The solid hydrochloride of the resulting 2-(p-dimethylsulfamoylphenoxy)-1-piperazine carboxanilide is precipitated with anhydrous hydrogen chloride.

This salt (12 g.) is heated with 20 g. of phosphorus pentoxide in 40 ml. of phosphorus oxychloride for 1 day and then poured into 400 g. of ice water. The oil precipitated with potassium carbonate is extracted with chloroform and the chloroform solution is extracted with 125 ml. of dilute hydrochloric acid. After clarifying with charcoal the aqueous layer is treated with potassium carbonate and resulting oil is subjected to partition chromatography to yield 2-dimethylsulfamoyl-11-(1-piperazinyl)-dibenz[b,f][1,4[oxazepine which melt at 187–189° C., when recrystallized from chloroform petroleum ether.

EXAMPLE 10

Preparation of 2-dimethylsulfamoyl)-11-(4-ethyl-1-piperazinyl)-dibenz[b,f][1,4]oxazepine 2 - dimethylsulfamoyl - 11-(1-piperazinyl)dibenz[b,f]-[1,4]oxazepine (Example 9) is treated with a slight excess of diethylsulfate in chloroform. When alkylation is complete, the reaction mixture is extracted with aqueous hydrochloric acid and the product is precipitated with ammonium chloride to yield 2-dimethylsulfamoyl-11-(4-ethyl-1-piperazinyl)dibenz[b,f][1,4]-oxazepine.

EXAMPLE 11

Preparation of 11-(4-methyl-1-piperazinyl)-2-propionyldibenz-[b,f][1,4]oxazepine 11 - (4 - methyl-1-piperazinyl)-2-nitrodibenz[b,f][1,4]-oxazepine is dissolved in dilute hydrochloric acid and hydrogenated in the presence of palladium-on-charcoal to yield the corresponding 2-amino derivative.

The above 2-amino derivative is diazotized at 0–5° C., and then added to a neutralized solution of propionaldehyde oxime at about 25° C. in the presence of a little copper. When coupling is complete, the resulting 2-(α-oximinopropyl) derivative is extracted into acidic solution and this base is reprecipitated by treatment with ammonia. The crude product is further purified by dissolving it in sodium hydroxide solution and reprecipitating the base by the addition of ammonium chloride. This oximino derivative is then heated with levulinic acid to effect transoximination thereby yielding 11-(4-methyl-1-piperazinyl)2 - propionyldibenz[b,f][1,4]oxazepine which is isolated from the reaction mixture.

EXAMPLE 12

Preparation of 2-acetyl-11-(1-piperazinyl)dibenzo-[b,f][1,4]thiazepine p-(o-Aminophenylthio)acetophenone (Example 7) is treated with phosgene in o-dichlorobenzene and cyclized with aluminum chloride to give 2-acetyldibenzo[b,f][1,4]thiazepin-11(10H)-one. This compound is then heated with phosphorus pentachloride in toluene and the solvents are removed by distillation. The resulting 11-chloro derivative is heated with piperazine in toluene containing pyridine to yield the desired 2-acetyl-11-(1-piperazinyl)dibenzo[b,f][1,4]thiazepine.

EXAMPLE 13

Preparation of 2-acetyl-11-(4-methyl-1-piperazinyl)dibenzo[b,f][1,4]thiazepine

The 11-piperazinyl derivative of the preceding example is heated with a mixture of Formalin and formic acid to yield 2-acetyl-11-(4-methyl - 1 - piperazinyl)dibenzo[b,f][1,4]thiazepine.

EXAMPLE 14

Preparation of 2-acetyl-11-(1-piperazinyl)dibenz-[b,f][1,4]oxazepine

The procedures of Example 12 are repeated using an equivalent amount of p-(o-aminophenoxy)acetophenone (Example 1) as starting material instead of p-(o-aminophenylthio)acetophenone. After suitable purification, 2-acetyl-11-(1 - piperazinyl)dibenz[b,f][1,4]oxazepine is isolated.

EXAMPLE 15

Preparation of 2-acetyl-11-[4-(2-hydroxyethyl)-1-piperazinyl]dibenz[b,f][1,4]oxazepine The product of Example 14 is treated with ethylene oxide in methanol to give 2-acetyl-11-[4-(2-hydroxyethyl)-1-piperazinyl]dibenz[b,f][1,4]oxazepine.

EXAMPLE 16

Preparation of 2-dimethylsulfamoyl-11-(4-methyl-1-piperazinyl)dibenzo[b,f][1,4]thiazepine The procedure for Example 8 is repeated. When N-methylpiperazine is substituted for piperazine in the second step, 2'-(p-dimethylsulfamoylphenylthio)-4-methyl-1-piperazine carboxanilide is obtained, melting point 151–152° C. The procedure of Example 8 is continued; 2-dimethylsulfamoyl - 11 - (4-methyl - 1 - piperazinyl)dibenzo[b,f][1,4]thiazepine melting point 162–165° C. is isolated as the desired end product.

EXAMPLE 17

Preparation of 3- (and 2) cyano-11-(4-methyl-1-piperazinyl)dibenz[b,f][1,4]oxazepine 2-chloro-4-nitrobenzoic acid dissolved in tetrahydrofuran is treated with carbonyldiimidazole and heated until evolution of carbon dioxide is complete. The resulting solution is treated with o-aminophenol to yield 2-chloro-2'-hydroxy-4-nitrobenzanilide. This anilide is cyclized with potassium carbonate in dimethylformamide to give 3 - nitrodibenz[b,f][1,4]oxazepin-11(10H)-one. Treatment of this intermediate with phosphorus pentachloride followed by N-methylpiperazine, as in Example 9, then gives 3-nitro-11-(4-methyl-1-piperazinyl)dibenz-[b,f][1,4]oxazepine.

This 3-nitro compound is reduced and diazotized, using the identical procedure described for the 2-isomer in Example 11, and the resulting 3-diazo derivative is treated with cuprous cyanide in hydrochloric acid to yield 3-cyano - 11 - (4 - methyl-1-piperazinyl)dibenz[b,f][1,4] oxazepine.

When 2 - nitro-11-(4-methyl-1-piperazinyl)dibenz[b,f][1,4]oxazepine is similarly reduced, diazotized and treated with cuprous cyanide in hydrochloric acid, the product is 2-cyano-11-(4 - methyl-1-piperazinyl)dibenz-[b,f][1,4]oxazepine.

EXAMPLE 18

Preparation of 2-ethoxycarbonyl-11-(4-methyl-1-piperazinyl)dibenz[b,f][1,4]oxazepine A mixture of 31 g. of o-chloronitrobenzene, 33 g. of ethyl p-hydroxybenzoate, 30 ml. of pyridine, 15 g. of potassium carbonate and 10 ml. of dimethylacetamide is refluxed for 7 hours and then poured into 800 ml. of dilute hydrochloric acid. The resulting oil is extracted with 500 ml. of benzene and concentrated to a solid. Washing with petroleum ether yields solid ethyl o-(o-nitrophenoxy)benzoate suitable for reduction.

The above ester in 250 ml. of ethanol is treated with 53 g. of ammonium chloride, 100 ml. of water, 20 ml. of conc. hydrochloric acid and 65 g. of zinc dust. After heating at 95–100° overnight, the basic reaction mixture is diluted with 380 ml. of water, cooled to 10° and filtered. The resulting solid is extracted with 250 ml. of chloroform which is dried over potassium carbonate and then concentrated to yield solid ethyl p-(o-aminophenoxy)benzoate.

This amino ether is then treated with ethyl chlorocarbonate and then with N-methylpiperazine by the procedure described in Example 3 to give 2'-(p-ethoxycarbonylphenoxy)-4-methyl - 1 - piperazinecarboxanilide. This compound is converted to the hydrochloride with anhydrous hydrogen chloride in chloroform, and the salt (10 g.) is refluxed with 10 g. of phosphorus pentoxide in 35 ml. of phosphorus oxychloride for 1 day. The mixture is treated with 200 ml. of ethanol and concentrated to dryness. The residue in 200 ml. of ether is washed with 250 ml. of water. The acidic aqueous layer is treated with concentrated ammonium hydroxide and then extracted with ether. Concentration of the ether yields the crude base which, when recrystallized twice from ether-petroleum ether, gives 2-(ethoxycarbonyl)-11-(4-methyl-1-piperazinyl)dibenz[b,f][1,4]oxazepine, melting point 109–111° C.

EXAMPLE 19

Preparation of 2-nitro-11-(4-methyl-1-piperazinyl) dibenz[b,f][1,4]oxazepine

A solution of 8.05 grams of 2-chloro-5-nitrobenzoic acid in 10 milliliters of anhydrous tetrahydrofuran is treated with a solution of 7.9 grams of carbonyldiimidazole in 80 milliliters of tetrahydrofuran. The solution is heated under reflux for one-half hour to complete evolution of the carbon dioxide formed and then treated with 4.36 grams of o-aminophenol in 30 milliliters of tetrahydrofuran. The solution is stirred at room temperature for 1 hour and refluxed for 15 minutes. The solvent is removed by distillation under reduced pressure and the residue is taken up in 80 milliliters of Normal sodium hydroxide in two portions. The solution is filtered with charcoal and the filtrate is treated with saturated ammonium chloride to precipitate 2-chloro-2'-hydroxy-5-nitrobenzanilide. The product melts at 191°–192° C. after recrystallization from the minimum amount of hot methanol diluted with an equal volume of 0.1 Normal hydrochloric acid.

A solution of 5.85 grams of the above benzanilide in 20 milliliters of dimethylacetamide is treated with 2.7 grams of anhydrous potassium carbonate and the mixture is stirred and heated in an oil bath maintained at 180° C. for 5 minutes when the potassium carbonate has virtually all reacted. The mixture is cooled quickly and diluted with 20 milliliters of Normal sodium hydroxide and 100 milliliters of water. The precipitate is collected by filtration and recrystallized from about 500 milliliters of ethanol to yield 2 - nitrodiben[b,f][1,4]oxazepine-11-(10-H)-one as very fine nearly colorless needles which melt at 260–262° C.

To a suspension of 1.5 grams of phosphorus pentachloride in 6 milliliters of anhydrous benzene is added 1.6 grams of 2-nitrodibenz[b,f][1,4]oxazepine-11-(10-H)-one and 6 milliliters more of benzene. The mixture is refluxed for 5 minutes during which time it becomes homogeneous and evolves hydrogen chloride and then is treated with a solution of 1.2 grams of N-methylpiperazine in 12 milliliters of toluene. Refluxing is continued for 1 hour and the product is extracted with two 24-milliliter portions of 0.5 Normal hydrochloric acid. The aqueous layers are combined, filtered with charcoal and treated with concentrated ammonium hydroxide to precipitate yellow 2-nitro-11-(4-methyl-1-piperazinyl)dibenz[b,f][1,4]oxazepine. When recrystallized from hexane the product melts at 189°–191° C.

EXAMPLE 20

Preparation of 2-nitro-11-(4-methyl-1-piperazinyl) dibenzo[b,f][1,4]thiazepine

A mixture of p-nitrochlorobenzene and o-aminobenzenethiol is heated under reflux in dimethylformamide in the presence of potassium carbonate, following the pro-

11 cedure described in Example 7. The resulting o-(p-nitrophenylthio)-aniline is treated with phosgene in o-dichlorobenzene and, after heating to expel excess phosgene and hydrogen chloride, cyclized with aluminum chloride to yield 2-nitrodibenzo[b,f][1,4]thiazepin-11(10H)-one.

This 2-nitro-11-one derivative is treated with phosphorus pentachloride in toluene to give, after removal of the solvent and phosphorus oxychloride by distillation, 11-chloro - 2 - nitrodibenzo[b,f][1,4]thiazepine. Heating this 11-chloro compound with an excess of N-methylpiperazine in toluene then yields the 2-nitro-11-(4-methyl-1-piperazinyl)dibenzo[b,f][1,4]thiazepine of the example.

EXAMPLE 21

Preparation of 2-nitro-11-(1-piperazinyl)dibenz[b,f][1,4]oxazepine

2 - nitrodibenz[b,f][1,4]oxazepine-11(10H)-one, prepared as in Example 19, is treated with phosphorus pentachloride in toluene, and the resulting 11-chloro-2-nitrodibenz[b,f][1,4]oxazepine is then heated with piperazine to yield 2-nitro-11-(1-piperazinyl)dibenz[b,f][1,4]oxazepine.

EXAMPLE 22

Preparation of 2-nitro-11-(1-piperazinyl)dibenzo[b,f][1,4]thiazepine

11 - chloro - 2 - nitrodibenzo[b,f][1,4]thiazepine (Example 20) is heated in toluene with excess piperazine to give 2 - nitro-11-(1-piperazinyl)dibenzo[b,f][1,4]thiazepine.

EXAMPLE 23

Preparation of 2-amino-11-(4-methyl-1-piperazinyl)dibenz[b,f][1,4]oxazepine

A suspension of 2.5 g. of 2-nitro-11-(4-methyl-1-piperazinyl)dibenz[b,f][1,4]oxazepine in 125 ml. of alcohol and 0.1 g. of 10% palladium-on-carbon catalyst is shaken under hydrogen in a Parr apparatus for 24 hours. The catalyst is removed by filtration, and the alcoholic solution is evaporated under reduced pressure to give the crude product as a solid residue, melting point 95°–97° C. The crude product is purified by recrystallization from alcohol, or by dissolving, in dilute aqueous hydrochloric acid followed by reprecipitation with aqueous ammonia. Using the latter procedure, the base is extracted into diethyl ether, the ether extract is dried over potassium hydroxide pellets, and the product crystallized by the addition of petroleum ether, collected and dried. When isolated in this manner, 2-amino-11-(4-methyl-1-piperazinyl)-dibenz[b,f][1,4]oxazepine melt at 112°–113° C., and is a pale yellow crystalline solid.

EXAMPLE 24

Preparation of 2-amino-11-(1-piperazinyl)dibenz[b,f][1,4]oxazepine

The product 2 - nitro-11-(1-piperazinyl)dibenz[b,f][1,4]oxazepine, (prepared in Example 21), is hydrogenated over a palladium-on-carbon catalyst in ethanol, using the procedure of Example 23, to give 2-amino-11-(1-piperazinyl)dibenz[b,f][1,4]oxazepine.

EXAMPLE 25

Preparation of 2-amino-11-(4-methyl-1-piperazinyl)dibenzo[b,f][1,4]thiazepine

When 2-nitro-11-(4-methyl-1-piperazinyl)dibenzo[b,f][1,4]thiazepine (Example 20) is reduced with zinc in ethanolic ammonium chloride the compound 2-amino-11-(4-methyl-1-piperazinyl)dibenzo[b,f][1,4]thiazepine, is obtained.

12

EXAMPLE 26

Preparation of 2-amino-11-(1-piperazinyl)dibenzo[b,f][1,4]thiazepine 2-nitro - 11 - (1-piperazinyl)dibenzo[b,f][1,4]thiazepine (prepared in Example 22) is reduced with zinc and ethanolic ammonium chloride to produce 2-amino-11-(1-piperazinyl)dibenzo[b,f][1,4]thiazepine.

We claim:
1. A piperazine compound of the formula:

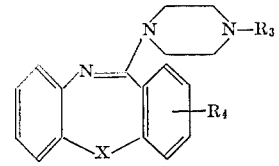

wherein X is selected from the group consisting of oxygen and sulfur; $R_3$ is selected from the group consisting of hydrogen, lower alkyl and hydroxyl(lower alkyl); $R_4$ is selected from the group consisting of cyano, di(lower alkyl) sulfamoyl, lower alkanoyl, $\alpha$-chlorovinyl, nitro, amino, and lower alkoxycarbonyl and non-toxic therapeutically useful acid addition salts.

2. The piperazine compound according to claim 1: 2-($\alpha$-chlorovinyl)-11-(4-methyl - 1 - piperazinyl)dibenz[b,f][1,4]oxazepine.

3. The piperazine compound according to claim 1: 2-dimethylsulfamoyl-11-(4-methyl - 1 - piperazinyl)dibenz[b,f][1,4]oxazepine.

4. The piperazine compound according to claim 1: 2-nitro-11-(4-methyl - 1 - piperazinyl)dibenz[b,f][1,4]oxazepine.

5. The piperazine compound according to claim 1: 2-acetyl-11-(4-methyl - 1 - piperazinyl)dibenz[b,f][1,4]oxazepine.

6. The piperazine compound according to claim 1: 2-acetyl-11-(4-methyl - 1 - piperazinyl)dibenzo[b,f][1,4]thiazepine.

7. The piperazine compound according to claim 1: 2-amino-11-(4-methyl - 1 - piperazinyl)dibenz[b,f][1,4]oxazepine.

8. The piperazine compound according to claim 1: 2-dimethylsulfamoyl-11-(4-methyl - 1 - piperazinyl)dibenzo[b,f][1,4]thiazepine.

9. The piperazine compound according to claim 1: 2-nitro-11-(4-methyl - 1 - piperazinyl)dibenzo[b,f][1,4]thiazepine.

10. The piperazine compound according to claim 1: 2-cyano-11-(4-methyl - 1 - piperazinyl)dibenz[b,f][1,4]oxazepine.

References Cited

UNITED STATES PATENTS

| 3,038,896 | 6/1962 | Habict et al. | 260—268 X |
| 3,210,372 | 10/1965 | Werner | 260—327 |
| 3,268,557 | 8/1966 | Weber | 260—327 |
| 3,274,058 | 9/1966 | Weber | 260—268 X |
| 3,306,934 | 2/1967 | Engelhardt et al. | 260—268 X |
| 3,329,717 | 7/1967 | Krapcho | 260—268 X |
| 3,342,807 | 9/1967 | Dietrich | 260—239 |

FOREIGN PATENTS 246,156   4/1966   Austria.

DONALD G. DAUS, Primary Examiner

U.S. Cl. X.R.

260—141, 247.1, 247.5, 247.7, 293, 293.4, 326.81, 327, 328, 333, 335, 463, 552, 543, 553, 556, 561, 580, 592, 646; 424—246, 248, 250, 267, 274